(12) United States Patent
Nakajima et al.

(10) Patent No.: US 6,317,280 B1
(45) Date of Patent: Nov. 13, 2001

(54) THERMOMAGNETIC RECORDING AND REPRODUCING HEAD HAVING A HEATING HEAD WITH A WIDTH NARROWER THAN THE MAGNETIC HEADS, A RECORDING AND REPRODUCING DEVICE WITH SUCH A HEATING HEAD AND METHODS RELATED THERETO

(75) Inventors: Junsaku Nakajima, Kashihara; Takeshi Yamaguchi, Sakai, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/159,700

(22) Filed: Sep. 24, 1998

(30) Foreign Application Priority Data

Sep. 26, 1997 (JP) .................................................. 9-262417

(51) Int. Cl.⁷ ...................................................... G11B 5/02
(52) U.S. Cl. ............................... 360/59; 360/55; 360/114; 369/13
(58) Field of Search ............................... 360/59, 55, 317, 360/114, 313, 234, 234.7; 369/13, 14, 101

(56) References Cited

U.S. PATENT DOCUMENTS 5,656,385  8/1997  Nakajima et al. .
5,986,978 * 11/1999  Rottmayer et al. ..................... 369/13

FOREIGN PATENT DOCUMENTS 2 617 025   3/1997  (JP) .

* cited by examiner

*Primary Examiner*—Alan T. Faber
(74) *Attorney, Agent, or Firm*—David G. Conlin; William J. Daley, Jr.; Dike, Bronstein, Roberts & Cushman, Intellectual Property Practice Group Edwards & Angell, LLP

(57) ABSTRACT

A thermomagnetic recording and reproducing head includes a floating slider, and a heating head, a reproduction-use magnetic head as an MR head and a recording-use magnetic head as a thin-film inductive head mounted on the floating slider in this order from an upstream side of a track. The heating section of the heating head is formed by boron nitride or ruthenium oxide, and has a width narrower than the widths of the reproduction-use magnetic head and recording-use magnetic head. Moreover, the recording layer of a disk medium is made from an N-type ferrimagnetic material, the coercive force of the recording layer at a recording temperature and saturation magnetization thereof at a reproduction temperature are adjusted, and the compensation temperature of the recording layer is adjusted to be substantially room temperature. The thermomagnetic recording and reproducing head can realize a narrow track without decreasing the widths of the recording-use magnetic head and reproduction-use magnetic head, thereby increasing the track density.

26 Claims, 14 Drawing Sheets

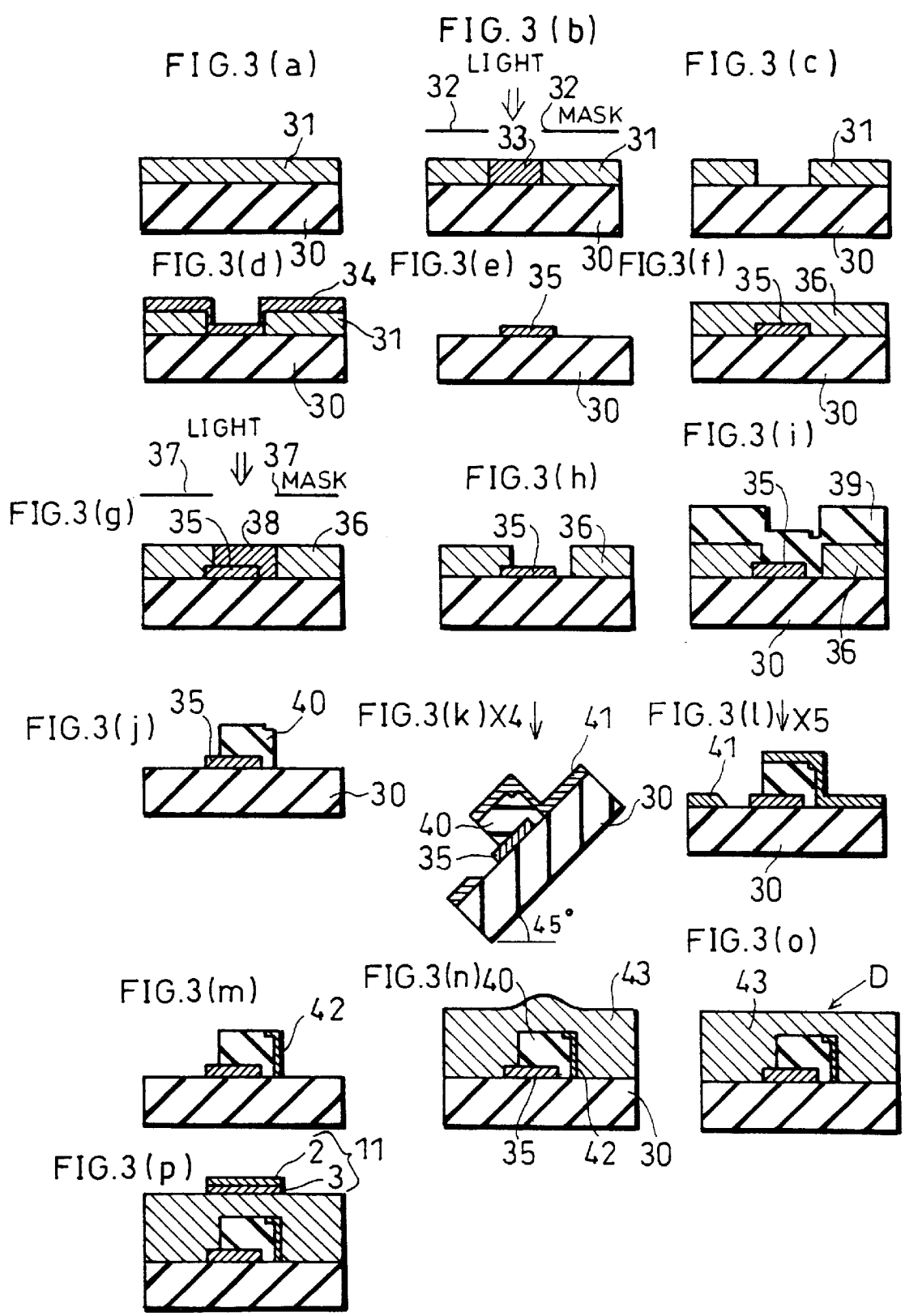

THERMOMAGNETIC RECORDING AND REPRODUCING HEAD HAVING A HEATING HEAD WITH A WIDTH NARROWER THAN THE MAGNETIC HEADS, A RECORDING AND REPRODUCING DEVICE WITH SUCH A HEATING HEAD AND METHODS RELATED THERETO

FIELD OF THE INVENTION

The present invention relates to a thermomagnetic recording medium, a thermomagnetic recording and reproducing head for recording and reproducing information using the thermomagnetic recording medium, and a device incorporating the thermomagnetic recording and reproducing head.

BACKGROUND OF THE INVENTION

Magnetic disks such as hard disks, and magnetic disk devices are widely used as external memories for computers.

Referring to FIGS. 15 and 16, the following description will explain a conventional magnetic recording and reproducing device for recording and reproducing information using the magnetic disk.

As illustrated in FIG. 15, the conventional magnetic recording and reproducing device records and reproduces information on a recording layer 122b (FIG. 16) of a magnetic disk 122.

The magnetic recording and reproducing device feeds an input signal from a host system 171 to an encoder 175 through an interface 172, a system controller 173, and an ECC (error correcting codes) circuit 174. After encoding the input signal into a serial magnetic-field-modulated signal by the encoder 175 and amplifying the signal by a pre-amplifier 176, the resultant signal is recorded as a magnetic pattern on the recording layer 122b of the magnetic disk 122 by a recording-use magnetic head 102 (FIG. 16) of a magnetic recording and reproducing head 150.

Meanwhile, a magnetic flux leaking from the recording layer 122b of the magnetic disk 122 according to a magnetization state is detected by a reproduction-use head 103 (FIG. 16), amplified by a pre-amplifier 180, adjusted in its waveform by a waveform equalizer 179, goes through a PLL (phase locked loop) circuit 178, and is decoded by a decoder 177. The decoded signal is output to the host system 171 through the ECC circuit 174, system controller 173, and interface 172, thereby reproducing information.

The serial signal amplified by the pre-amplifier 180 is also input to a servo circuit 181. By performing a feedback-control in response to the serial signal by a driver 182, tracking of the magnetic recording and reproducing head 150 with respect to the magnetic disk 122 is controlled. Moreover, the serial signal is also input to a servo circuit 183, to feedback-control the rotation speed of a spindle motor 184.

FIG. 16 shows the magnetic recording and reproducing head 150 used in the conventional magnetic recording and reproducing device. In the magnetic recording and reproducing head 150, the recording-use magnetic head 102 made of an inductive thin-film head and the reproduction-use head 103 made of a MR (magneto-resistive) head are mounted on the back surface of a floating slider 101. The floating slider 101 is supported by a suspension arm 120, and moves in a floated state over the surface of the magnetic disk 122 with a rotation of the magnetic disk 122 in a direction shown by arrow X6. Provided on the back surface of the floating slider 101 are head terminal electrodes 105 of the recording-use magnetic head 102, and head terminal electrodes 106 of the reproduction-use magnetic head 103. Lead wires 121 connected to the head terminal electrodes 105 and 106 are arranged along the suspension arm 120 and connected to electric circuits corresponding to the respective heads of the magnetic recording and reproducing device.

In general, for the recording layer of the magnetic disk, a material that is a hard magnetic material and also a ferromagnetic material, for example, CoPtCr, is used.

The magnetic disk 122 is fabricated, for example, by forming a 0.5-$\mu$m-thick recording layer 122b made from a ferromagnetic material such as CoPtCr on a 1.5-mm-thick disk substrate 122a.

When recording information, a current corresponding to the information to be recorded flows in the recording-use magnetic head 102 through the head terminal electrodes 105 of the recording-use magnetic head 102. At this time, recording is carried out by sequentially inverting the magnetization of the recording layer 122b of the magnetic disk 122 by a signal magnetic field formed by a leakage magnetic flux from the head gap of the recording-use magnetic head 102. The arrows in FIG. 16 represent the magnetization state.

When reproducing information, the magnetic flux leaking from the recording layer 122b according to the magnetization state of the recording layer 122b of the magnetic disk 122 is detected by the reproduction-use head 103. Then, a signal is output from the head terminal electrodes 106 of the reproduction-use magnetic head 103, thereby reproducing the information.

The track width Lt of the magnetic disk 122 on which information is recorded in the above-mentioned manner is determined by the width of the recording-use magnetic head 102. Therefore, if the width of the reproduction-use magnetic head 103 is made narrower than the track width Lt, the reproduction output is lowered. On the other hand, if the width of the reproduction-use magnetic head 103 is made wider than the track width Lt, information from an adjacent track is mixed (i.e., crosstalk occurs). Thus, the recording-use magnetic head 102 and reproduction-use magnetic head 103 are usually fabricated to have substantially the same width.

Meanwhile, an increase in quantity of information to be processed has created a demand for high recording density. In order to achieve high-density recording, it is necessary to improve not only the linear density of recording bits, but also the track density (i.e., reduce the track width Lt). Hence, efforts to reduce the track width of the magnetic heads have been made.

In order to realize high-density recording by using a magnetic recording and reproducing head of the above-mentioned conventional structure to improve the track density, it is essential to reduce the widths of the recording-use magnetic head and reproduction-use magnetic head.

However, a reduction in the track width by a decrease in the width of the reproduction-use MR (magneto-resistive) head increases the hysteresis of the magnetic properties of the head, causes readout errors, and shortens the life of the head. A reduction in the track width by a decrease in the width of the recording-use head causes a lowering of leakage signal magnetic field from the gap, resulting in insufficient recording. Furthermore, since the track width is decreased, it is necessary to fabricate the heads with high precision.

SUMMARY OF THE INVENTION

It is an object of the present invention to provide a thermomagnetic recording and reproducing head, thermomagnetic recording and reproducing device, and thermomagnetic recording medium, capable of increasing the track density by realizing a narrow track without decreasing the widths of a recording-use magnetic head and a reproduction-use magnetic head.

In order to achieve the above object, a thermomagnetic recording and reproducing head of the present invention includes:

a recording-use magnetic head for applying a signal magnetic field according to information to be recorded to a recording portion of a recording layer of a thermomagnetic recording medium heated to a recording temperature during recording;

a reproduction-use magnetic head for detecting a magnetic flux generated according to recorded information from the recording portion of the recording layer of the thermomagnetic recording medium heated to a reproduction temperature during reproduction; and a heating head with a width narrower than the recording-use magnetic head and reproduction-use magnetic head, for heating the recording portion of the thermomagnetic recording medium to the recording temperature during recording, and to the reproduction temperature during reproduction.

With this structure, when recording information, the recording portion of the thermomagnetic recording medium, whose width is narrower than the recording-use magnetic head, is heated to the recording temperature by the heating head, and a signal magnetic field is applied to the recording portion by the recording-use magnetic head. It is therefore possible to record information only in the recording portion of a width narrower than the recording-use magnetic head without affecting adjacent tracks. When reproducing information, the recording portion of the thermomagnetic recording medium, whose width is narrower than the reproduction-use magnetic head, is heated to the reproduction temperature by the heating head, and a magnetic flux generated from the recording portion is detected by the reproduction-use magnetic head. Thus, only information recorded in the recording portion whose width is narrower than the reproduction-use magnetic head can be reproduced without being affected by adjacent tracks.

Hence, it is possible to narrow the width of the track without decreasing the widths of the recording-use magnetic head and reproduction-use magnetic head. As a result, the track density of the thermomagnetic recording medium is increased, thereby increasing the capacity thereof.

In order to achieve the above object, a thermomagnetic recording and reproducing device of the present invention has a thermomagnetic recording and reproducing head mounted on a single floating slider, the thermomagnetic recording and reproducing head including:

a recording-use magnetic head for applying a signal magnetic field according to information to be recorded to a recording portion of a recording layer of a thermomagnetic recording medium heated to a recording temperature during recording;

a reproduction-use magnetic head for detecting a magnetic flux generated according to recorded information from the recording portion of the recording layer of the thermomagnetic recording medium heated to a reproduction temperature during reproduction; and a heating head with a width narrower than the recording-use magnetic head and reproduction-use magnetic head, for heating the recording portion of the thermomagnetic recording medium to the recording temperature during recording, and to the reproduction temperature during reproduction.

With this structure, since the thermomagnetic recording and reproducing head is mounted on a single floating slider, the recording-use magnetic head, reproduction-use magnetic head and heating head constituting the thermomagnetic recording and reproduction head move with the single floating slider, it is possible to use a single driving mechanism as the mechanisms for driving the recording-use magnetic head, reproduction-use magnetic head, and heating head.

As a result, the driving of the recording-use magnetic head, reproduction-use magnetic head, and heating head can be controlled together, thereby simplifying and reducing the thermomagnetic recording and reproducing device in size.

Furthermore, in order to achieve the above object, a thermomagnetic recording medium of the present invention includes a recording layer made from an N-type ferrimagnetic material whose coercive force at a recording temperature is adjusted so that a signal magnetic field varying according to information to be recorded is recorded, whose saturation magnetization at a reproduction temperature is adjusted so that recorded information is reproduced by detection of a magnetic flux varying according to the recorded information, and whose compensation temperature is adjusted so as to be substantially room temperature.

With this structure, when recording information, since the recording-use magnetic head applies a signal magnetic field which is not smaller than the coercive force to the recording portion heated to the recording temperature, it is possible to record information in the recording portion. When reproducing information, since the reproduction-use magnetic head detects a magnetic flux of saturation magnetization generated from the recording portion heated to the reproduction temperature, it is possible to reproduce the information recorded in the recording portion. Besides, since the compensation temperature is substantially room temperature, leakage of magnetic flux does not occur at room temperature.

It is thus possible to record information only in the recording portion whose width is narrower than the recording-use magnetic head without affecting adjacent tracks, and reproduce only information recorded in the recording portion whose width is narrower than the reproduction-use magnetic head without being affected by adjacent tracks. In addition, this thermomagnetic recording medium can be handled easily at room temperature.

Accordingly, the track width can be narrowed without decreasing the widths of the recording-use magnetic head and reproduction-use magnetic head. Consequently, the track density of the thermomagnetic recording medium is increased, and therefore the capacity thereof is increased.

For a fuller understanding of the nature and advantages of the invention, reference should be made to the ensuing detailed description taken in conjunction with the accompanying drawings.

BRIEF DESCRIPTION OF THE DRAWINGS

FIGS. 3(a) to 3(p) are views for explaining the processes of fabricating a heating head as an element of the thermomagnetic recording and reproducing head shown in FIG. 1.

DESCRIPTION OF THE PREFERRED EMBODIMENTS

The following description will explain one embodiment of the present invention with reference to FIGS. 1 to 14.

First, with reference to FIGS. 1 and 12, a thermomagnetic recording and reproducing device 70 incorporating a thermomagnetic recording and reproducing head 50 of this embodiment will be explained.

Figure 12:
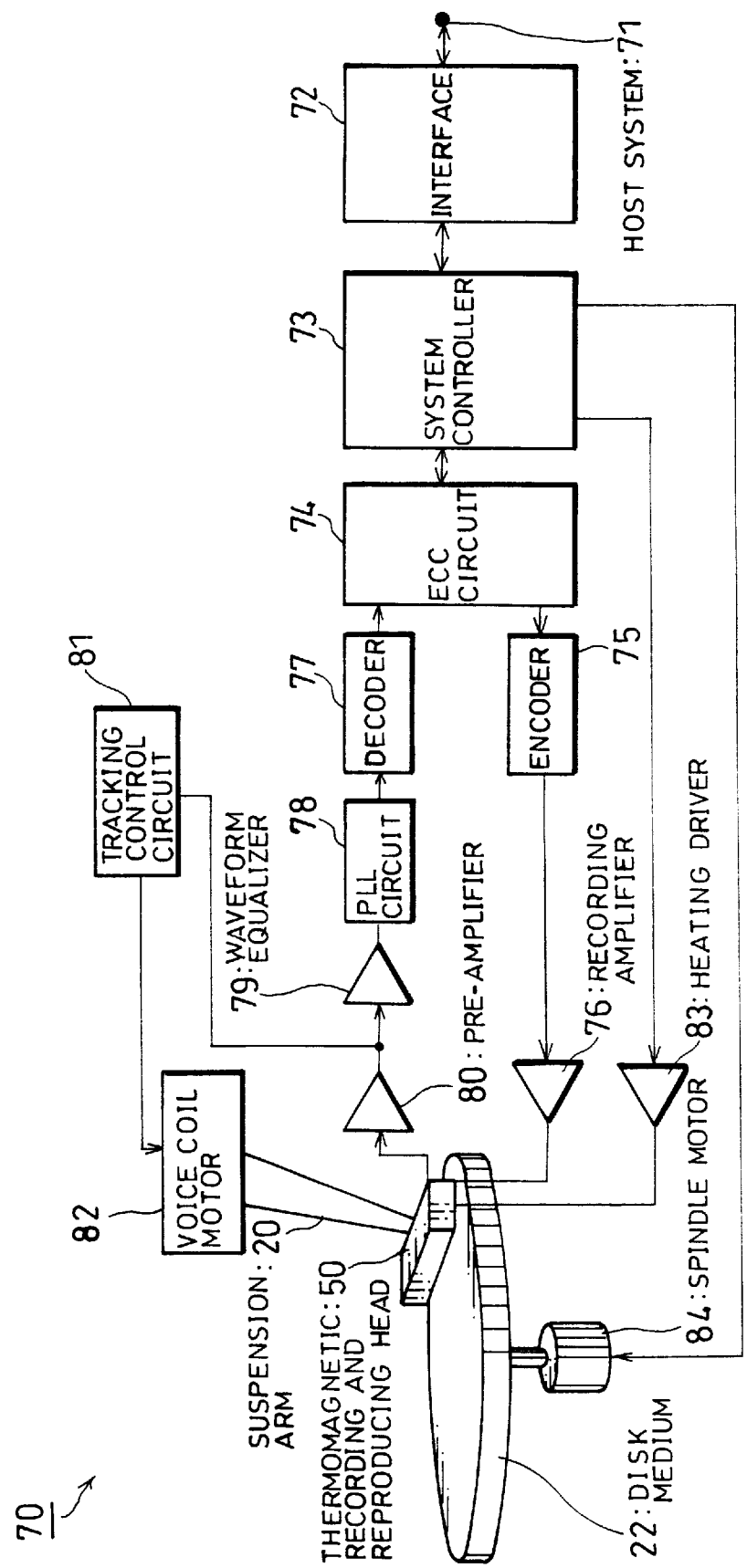
FIG. 12 is a view showing a schematic structure of a thermomagnetic recording and reproducing device according to one embodiment of the present invention.

As illustrated in FIG. 12, the thermomagnetic recording and reproducing device 70 of this embodiment records and reproduces information using the magnetic properties of an N-type ferrimagnetic material that forms a recording layer 22b (FIG. 1) of a disk medium 22. The magnetic properties of the recording layer 22b will be explained in detail later.

In the thermomagnetic recording and reproducing device 70, digital data are serially input as an input signal to an interface 72 from a host system 71. The input signal is input to an encoder 75 through a system controller 73 and ECC (error correcting codes) circuit 74. Each of the encoder 75 and a decoder 77 explained below is a signal processing circuit. The encoder 75 encodes the input signal to a serial magnetic-field modulated signal and feeds the signal to a recording amplifier 76. The serial signal amplified by the recording amplifier 76 is recorded as a magnetic pattern in a recording portion of the recording layer 22b of the disk medium 22 by a recording-use magnetic head 2 (FIG. 1) of the thermomagnetic recording and reproducing head 50. At this time, the recording portion of the disk medium 22 has been heated to a predetermined recording temperature by a heating head 4 (FIG. 1) which is controlled by the system controller 73 and heating driver 83 as recording control means.

Meanwhile, a magnetic flux corresponding to the magnetic pattern, generated from the recording portion of the disk medium 22, is detected by a reproduction-use magnetic head 3 (FIG. 1) of the thermomagnetic recording and reproducing head 50. At this time, the recording portion of the disk medium 22 has been heated to a predetermined reproduction temperature by the heating head 4 (FIG. 1) which is controlled by the system controller 73 and heating driver 83 as reproduction control means. Subsequently, the detected signal by the reproduction-use magnetic head 3 is amplified by a pre-amplifier 80, and then input to the decoder 77 through a waveform equalizer 79 and a PLL (phase locked loop) circuit 78. After decoding the reproduced signal by the decoder 77, the decoded signal is output from the interface 72 to the host system 71 through the ECC circuit 74 and system controller 73. Here, the waveform equalizer 79 is an equalizer for adjusting the reproduced signal which is weakened as the length of the wave becomes shorter due to resolution of the reproduction-use magnetic head 3. The PLL circuit 78 extracts a clock.

The system controller 73 feedback-controls the rotation speed of a spindle motor 84 in response to the reproduced serial signal, thereby achieving reproduction at a desired linear speed. Moreover, a tracking control circuit 81 feedback-controls a voice coil motor 82 in response to the serial signal from the pre-amplifier 80 so as to control the displacement of the thermomagnetic recording and reproducing head 50 in a radial direction of the disk medium 22, i.e., tracking, by using a suspension arm 20.

Referring now to FIGS. 1 to 5, the following description will explain the thermomagnetic recording and reproducing head 50 of this embodiment.

Figure 1:
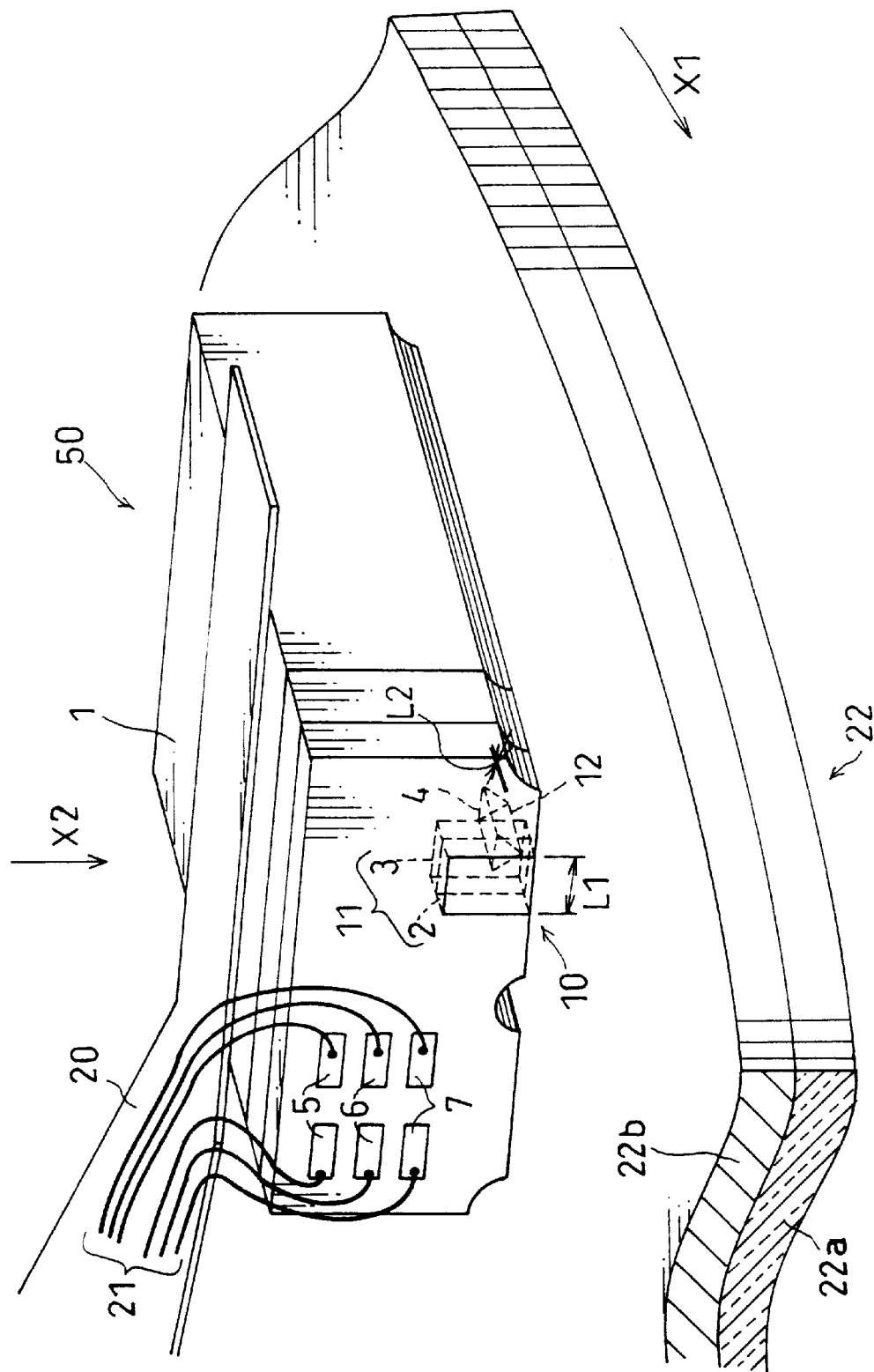
FIG. 1 is a view showing a schematic structure of a thermomagnetic recording and reproducing head according to one embodiment of the present invention.

As illustrated in FIG. 1, the thermomagnetic recording and reproducing head 50 of this embodiment includes a magnetic head 11 formed by the recording-use magnetic head 2 and reproduction-use magnetic head 3, and the heating head 4 on a single floating slider 1. The recording-use magnetic head 2, reproduction-use magnetic head 3, and heating head 4 will be hereinafter referred to as a composite head 10.

The floating slider 1 is supported by the suspension arm 20. The thermomagnetic recording and reproducing head 50 floats over the disk medium 22 with a rotation of the disk medium 22 in a direction shown by arrow X1.

Since the thermomagnetic recording and reproducing head 50 is disposed on the single floating slider 1, a single voice coil motor 82 is required for a mechanism for driving the thermomagnetic recording and reproducing head 50. As a result, the position of the thermomagnetic recording and reproducing head 50 can be easily controlled, and the thermomagnetic recording and reproducing device 70 can be simplified and reduced in its size.

The reproduction-use magnetic head 2 is a thin-film inductive head, and records information in a recording portion of the recording layer 22b of the disk medium 22, which has been heated to a recording temperature, by applying a signal magnetic field corresponding to information to be recorded. The reproduction-use magnetic head 3 is an MR (magneto-resistive) head, and reproduces information from the recording portion of the recording layer 22b of the disk medium 22, which has been heated to a reproduction temperature, by detecting a magnetic flux generated according to the recorded information. The recording-use magnetic head 2 and reproduction-use magnetic head 3 are formed as thin films having the same width or measurement in a direction crossing a track (a rotating direction of the disk medium 22) at right angles, on the back surface of the floating slider 1 (i.e., the surface facing the disk medium 22) by the same process for producing wafers of semiconductors. The recording temperature and reproduction temperature will be explained in detail later.

The heating head 4 heats the recording portion of the recording layer 22b of the disk medium 22 to the recording temperature during recording, and to the reproduction temperature during reproduction. The heating head 4 is formed to have a heating section 12 whose width is narrower than the magnetic head 11 (recording-use magnetic head 2 and reproduction-use magnetic head 3), on a surface of the floating slider 1 (i.e., the surface facing the disk medium 22) by the process for producing wafers so that the heating head 4 is located on an upstream side of the track with respect to the magnetic head 11.

As illustrated in FIG. 5(c), the heating head 4 is formed by covering two side faces of a triangular prism 40 made from an insulating material (preferably $SiO_2$) with a covering layer 42 made from a material for converting electrical energy into infrared energy (preferably boron nitride or ruthenium oxide). A portion of the covering layer 42, which is located on a side as the boundary of the two side faces of the triangular prism 40, serves as a heating section 12, and is positioned along the center line of the track of the disk medium 22. Moreover, the end sections of the covering layer 42 which are located on the base face side of the triangular prism 40 are respectively connected to an Al (aluminum) electrode pattern 35.

Figure 4:
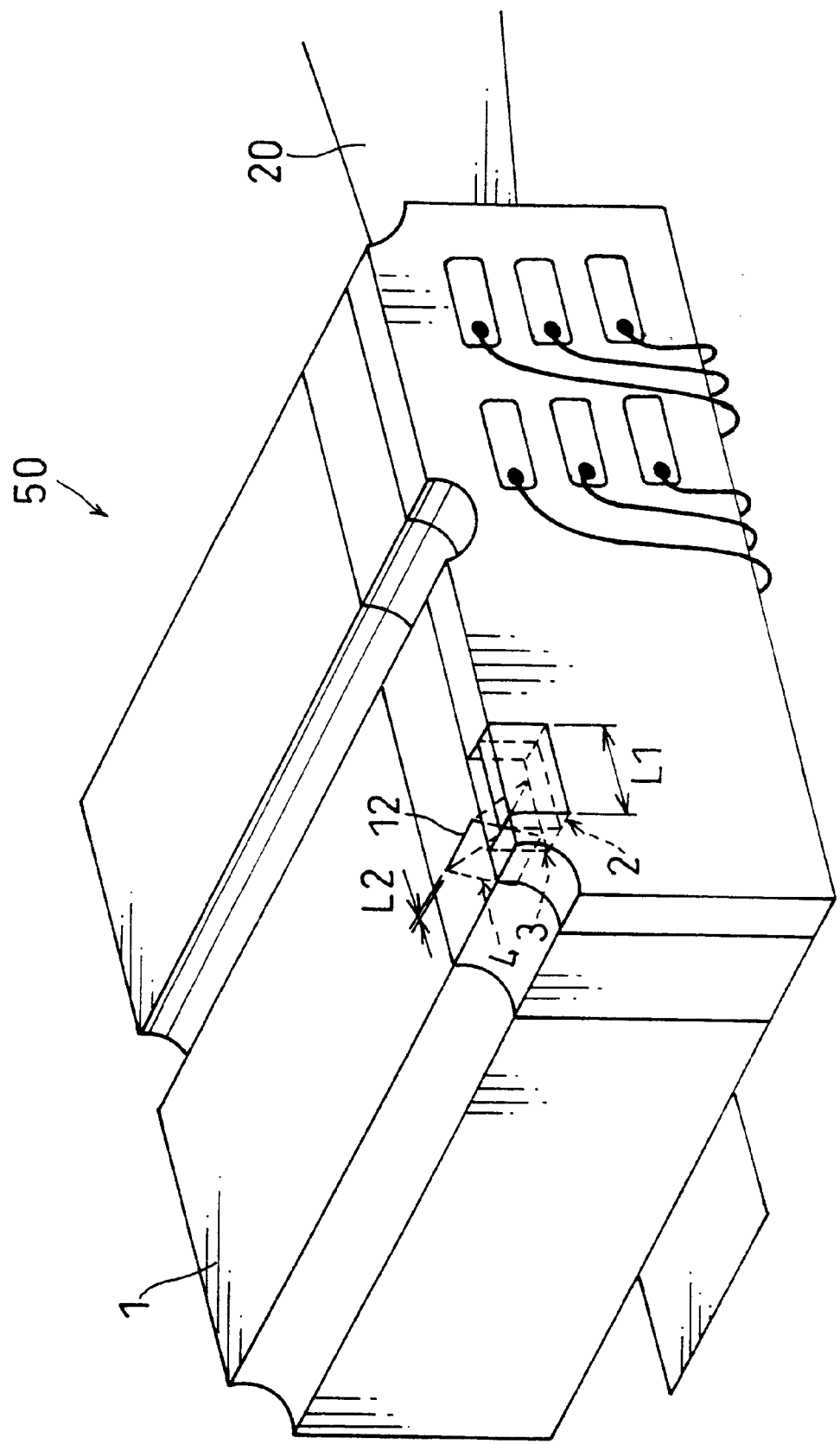
FIG. 4 is a view for explaining the succeeding steps of the fabrication of the heating head shown in FIG. 3.

Here, as illustrated particularly in FIG. 4, the width of the heating section 12 of the heating head 4, that is the effective width L2 (for example, 0.2 μm) or distance measured at right angles to a rotating direction of the disk medium 22, is made narrower than the width L1 (for example, 3 μm) of each of the recording-use magnetic head 2 and reproduction-use magnetic head 3 which is measured at right angles to a rotating direction of the disk medium 22.

As described above, in the thermomagnetic recording and reproducing head 50, the heating head 4 having the heating section 12 with the effective width L2, and the magnetic head 11 with the width L1 (L1>L2) are mounted on the floating slider 1 in this order from the upstream side of the track of the disk medium 22. In the magnetic head 11, either of the recording-use magnetic head 2 and reproduction-use magnetic head 3 can be positioned on the upstream side of the track.

Moreover, disposed on the back surface of floating slider 1 are head terminal electrodes 5 of the recording-use magnetic head 2, head terminal electrodes 6 of the reproduction-use magnetic head 3, and head terminal electrodes 7 of the heating head 4. These head terminal electrodes 5, 6 and 7 and the heads 2, 3 and 4 are connected to each other by the Al electrode pattern. Lead wires 21 connected to the head terminal electrodes 5, 6 and 7 are arranged along the suspension arm 20, and connected to electric circuits corresponding to the respective heads of the thermomagnetic recording and reproducing device 70.

Besides, the recording-use magnetic head 2 is controlled by the system controller 73 through the head terminal electrodes 5. Similarly, the reproduction-use magnetic head 3 is controlled by the system controller 73 through the head terminal electrodes 6. Furthermore, the heating head 4 is controlled by the system controller 73 and heating driver 83 through the head terminal electrodes 7.

Referring now to FIGS. 2 to 5, the following description will explain a process for fabricating the thermomagnetic recording and reproducing head 50.

As described above, the recording-use magnetic head 2, reproduction-use magnetic head 3, and heating head 4 are fabricated according to the same process as the process for producing wafers of semiconductors. The fabrication process will be schematically explained below with reference to FIGS. 2(a) to 2(e).

Figure 2A:
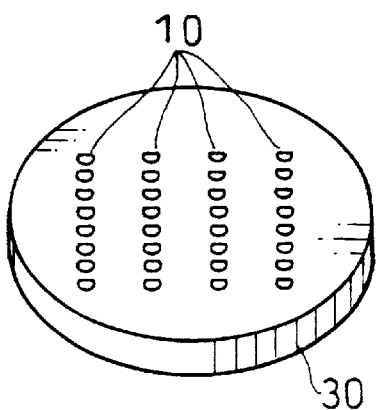
FIGS. 2(a) to 2(e) are views for schematically explaining the processes of fabricating the thermomagnetic recording and reproducing head shown in FIG. 1.

Step 1 (FIG. 2(a))

The composite heads 10 (recording-use magnetic heads 2, reproduction-use magnetic heads 3, and heating heads 4) are formed on an $Al_2O_3TiC$ substrate 30 which is to be the floating slider 1.

Figure 2B:
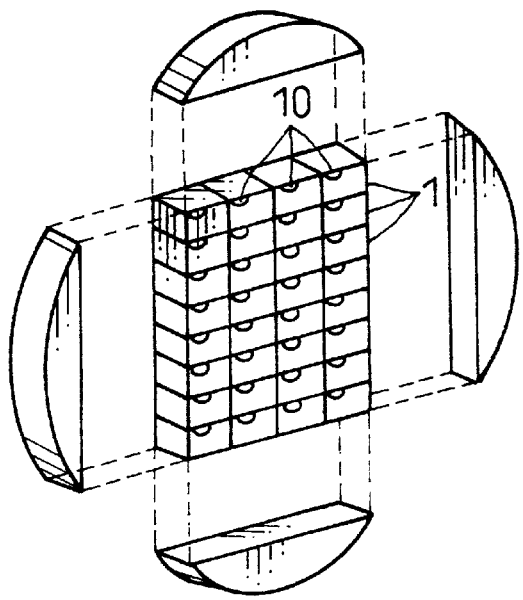

Step 2 (FIG. 2(b))

Figure 2C:
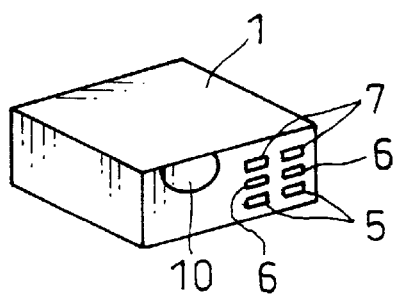

The $Al_2O_3TiC$ substrate 30 is cut into blocks so that each block includes one composite head 10. A single block cut is shown in FIG. 2(c).

Figure 2D:
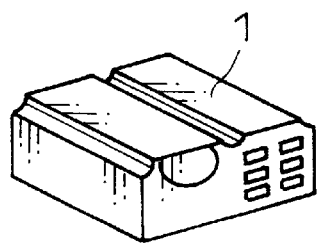

Step 3 (FIG. 2(d))

A surface of the block, which faces the disk medium 22, is processed to form the floating slider 1.

Figure 2E:
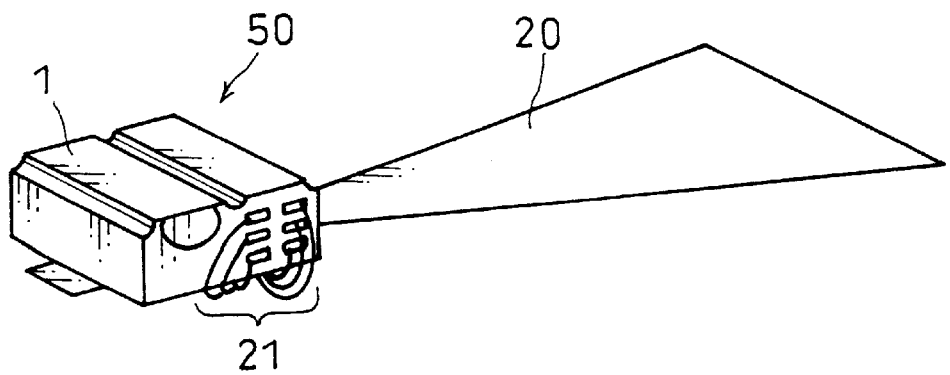

Step 4 (FIG. 2(e))

The floating slider 1 is fastened to the suspension arm 20, and the lead wires 21 are connected to the head terminal electrodes 5, 6 and 7.

Here, the recording-use magnetic head 2 and reproduction-use magnetic head 3 are fabricated by the wafer producing process including patterning, ion milling, lift-off techniques using sputtering and photolithography. Since these fabrication processes are known, the detail explanation thereof will be omitted here. Hence, only a process for fabricating the heating head 4 will be explained in detail below as a characteristic of the present invention.

Figure 5:
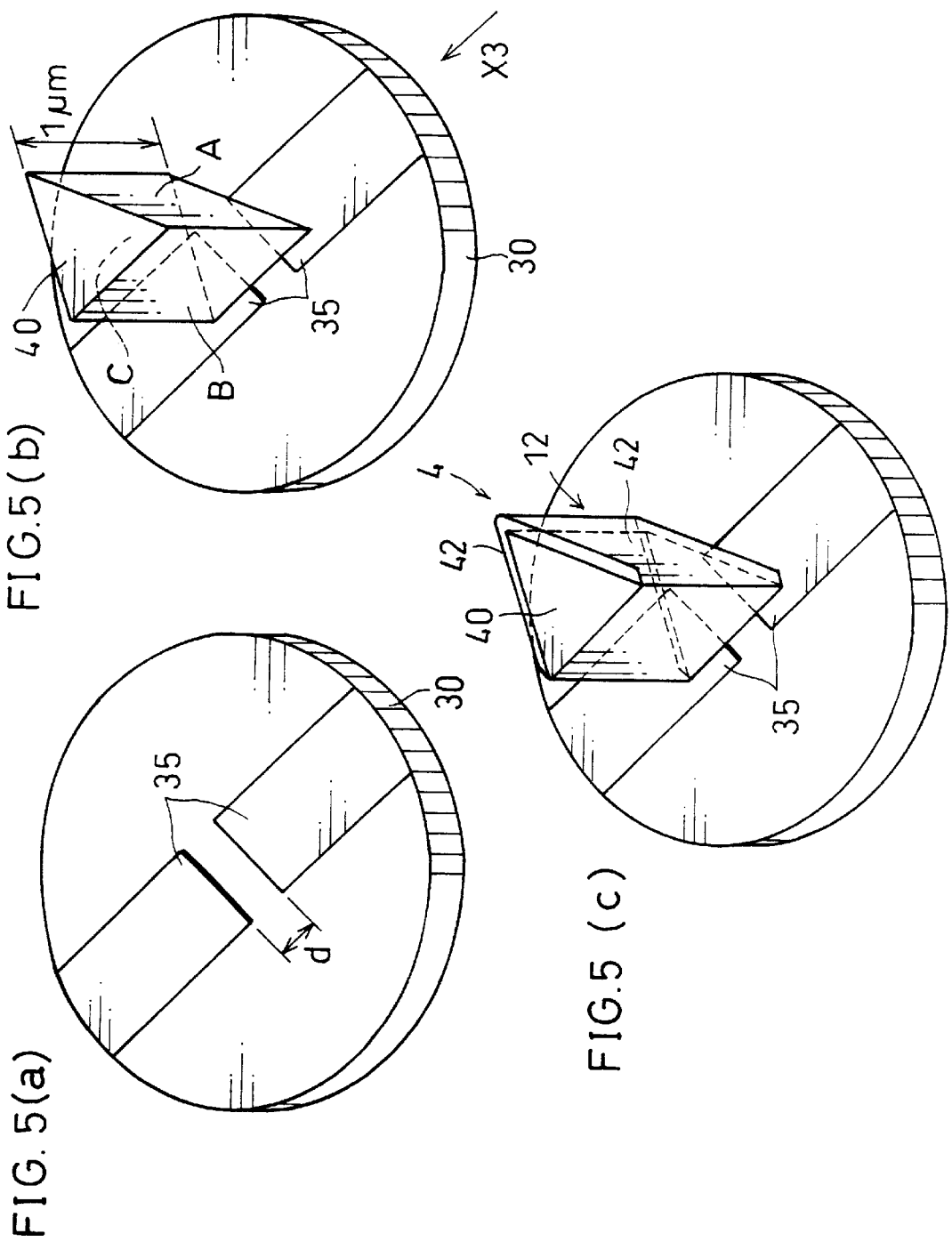
FIGS. 5(a) to 5(c) are views for explaining the processes of fabricating the heating head as an element of the thermomagnetic recording and reproducing head shown in FIG. 1.

Referring to FIGS. 3 to 5, the steps of forming the heating head 4 on the $Al_2O_3TiC$ substrate 30 will be explained below. The following explanation is given with reference to a single element in a wafer.

Step 1 (FIG. 3(a))

A resist is applied to the $Al_2O_3TiC$ substrate 30 by spincoating so as to form a 1.5-μm-thick resist layer 31. For the resist, AZ-1500 (available from Hoechst) is used.

Step 2 (FIG. 3(b))

In order to form the Al electrode pattern 35 (FIG. 3(e)), the resist is exposed through a mask 32.

Step 3 (FIG. 3(c))

An exposed portion 33 (FIG. 3(b)) is removed by development.

Step 4 (FIG. 3(d))

Al is deposited so as to form an Al layer 34 with a thickness of 50 nm.

Step 5 (FIG. 3(e))

The resist 31 is removed using an organic alkali solvent AZ remover 100 (available from Hoechst) while heating the resist 31 to 80° C. At this time, since the Al layer 34 on the resist layer 31 is removed, only the Al electrode pattern 35 remains on the $Al_2O_3TiC$ substrate 30.

The result of the above-mentioned steps is shown in FIG. 5(a). The distance d between the Al electrodes 35 is 1 μm.

Step 6 (FIG. 3(f))

A resist is applied to the $Al_2O_3TiC$ substrate 30 and Al electrode pattern 35 by spincoating so as to form a 1.5-μm-thick resist layer 36. For the resist, AZ-1500 (available from Hoechst) is used. The conditions in this step are the same as in Step 1.

Step 7 (FIG. 3(g))

In order to produce a triangular prism 40 (FIG. 3(j)) of the heating head 4 by $SiO_2$, the resist is exposed through a mask 37. The exposure is carried out by exposing the resist to G line (436 nm) of a mercury lamp for three seconds. The conditions in this step are the same as in Step 2.

Step 8 (FIG. 3(h))

An exposed portion 38 (FIG. 3(g)) is removed by development.

Step 9 (FIG. 3(i))

$SiO_2$ is layered on the $Al_2O_3TiC$ substrate 30, Al electrode pattern 35, and resist layer 36 so as to form a 1-μm-thick layer 39 of $SiO_2$.

Step 10 (FIG. 3(j))

The resist layer 36 is removed using an organic alkali solvent AZ remover 100 while heating the resist layer 36 to 80° C. At this time, since the $SiO_2$ layer 39 on the resist layer 36 is also removed, only the $SiO_2$ triangular prism 40 remains on the $Al_2O_3TiC$ substrate 30 and Al electrode pattern 35. The conditions in this step are the same as in Step 5.

The result of the above-mentioned steps is shown in FIG. 5(b). The $SiO_2$ triangular prism 40 is formed on the $Al_2O_3TiC$ substrate 30 and Al electrode pattern 35. Two side faces which can be seen in FIG. 5(b) are denoted by the "A face" and "B face, and a hidden face is the "C face". The height of the triangular prism 40 is 1 μm, and the width of each of the A face, B face, and C face is 2 μm. FIG. 3(j) is a view showing the triangular prism 40 from a direction shown by arrow X3. FIG. 3(j) are the cross sections of the substrate 30, electrode pattern 35, and triangular prism 40, which can be seen by cutting across them at right angles to the B face, and shown from the A face of the triangular prism 40. The subsequent steps will be explained by looking at the triangular prism 40 from the direction shown by arrow X3 of FIG. 5(b).

Step 11 (FIG. 3(k))

The $Al_2O_3TiC$ substrate 30 is tilted at 45° (within a range of ±10°), and boron nitride is deposited from a direction shown by arrow X4 so as to form a 0.1-μm-thick boron nitride layer 41. At this time, since the B face is hidden, the boron nitride layer 41 is formed only on the A face and C face. Namely, the boron nitride layer 41 is not formed on the B face.

Step 12 (FIGS. 3(l) and 3(m))

The $Al_2O_3TiC$ substrate 30 is moved back to a horizontal position, and etching is performed by applying ion milling with power of 200 W from a direction shown by arrow X5 for 10 minutes (FIG. 3(l)). Since etching by ion milling proceeds in a portion where an ion beam is incident perpendicularly, the boron nitride layer 41 is removed while leaving a covering layer 42 formed by the boron nitride deposited on the A face and C face (FIG. 3(m)).

The result of the above-mentioned steps is shown in FIG. 5(c).

Step 13 (FIG. 3(n))

$SiO_2$ is layered on the $Al_2O_3TiC$ substrate 30, Al electrode pattern 35, and $SiO_2$ triangular prism 40 having the boron nitride covering layer 42 so as to form a 5-μm-thick $SiO_2$ layer 43.

Step 14 (FIG. 3(o))

The $SiO_2$ layer 43 is polished so as to form a flat surface (D face).

Step 15 (FIG. 3(p))

The reproduction-use magnetic head 3 and recording-use magnetic head 2 are formed in this order on the D face so as to produce the magnetic head 11. The process of fabricating the magnetic head 11 is the same as a process of fabricating a magnetic head for use in a hard disk drive, and therefore the explanation thereof will be omitted here.

Step 16 (FIG. 4)

The thermomagnetic recording and reproducing head 50 is obtained through the sequence of fabrication steps explained with reference to FIGS. 2(a) to 2(e).

Next, the recording temperature and reproduction temperature will be explained. The recording temperature is a temperature at which a magnetization direction is written in a recording portion of the recording layer 22b by the recording-use magnetic head 2. The reproduction temperature is a temperature at which a magnetic flux generated from the recording portion of the recording layer 22b is detected by the reproduction-use magnetic head 3. Therefore, the recording portion of the recording layer 22b needs to be heated to the recording temperature during recording, and to the reproduction temperature during reproduction.

Heating of the recording portion of the recording layer 22b is carried out mainly by radiation from the heating section 12 of the heating head 4. Hence, the recording temperature and reproduction temperature can be determined by considering the power required for heating the recording portion of the recording layer 22b and the effects of heat generated by the heating section 12 on the periphery thereof.

In this embodiment, both of the recording temperature and reproduction temperature are set at 200° C. However, it is not necessarily to limit the recording temperature and reproduction temperature to 200° C.

Namely, the respective heads of the composite head 10 must be designed according to the recording temperature and reproduction temperature. Accordingly, the heating head 4 is designed so that it can raise the temperature of the recording portion of the recording layer 22b with low power in short time, and continuously heat the recording portion. Moreover, the recording-use magnetic head 2 is designed so as to apply a signal magnetic field greater than the coercive force of the recording layer 22b heated to the recording temperature. It can be said from experience that the magnetic field applied by the recording-use magnetic head 2 is around several hundred kA/m (several kOe). Furthermore, the reproduction-use magnetic head 3 is designed so as to have sensitivity capable of detecting a magnetic flux generated from the recording portion of the recording layer 22b heated to the reproduction temperature.

Meanwhile, the recording layer 22b of the disk medium 22 needs to arranged so that the coercive force at the recording temperature is recordable by the recording-use magnetic head 2 and the saturation magnetization at the reproduction temperature is reproducible by the reproduction-use magnetic head 3. Regarding the magnetic properties of the magnetic material forming the recording layer 22b and adjustment thereof, an explanation will be given later.

In the case where the composite head 10 is mounted and used in the thermomagnetic recording and reproducing device 70, it is possible to adjust the coercive force and saturation magnetization of the recording portion of the recording layer 22b by adjusting power to be supplied to the heating head 4.

Thus, by heating the recording layer 22b of the disk medium 22 with radiation from a portion of the boron nitride covering layer 42 (heating section 12) placed on one side of the $SiO_2$ triangular prism 40 (FIG. 5(c)), which side appears at the front surface of the floating slider 1, the width of the heated portion becomes substantially equal to the width L2 of the heating section 12. It is therefore possible to heat a portion which is as narrow as, for example, 0.2 μm in width.

Besides, information can be recorded only in a recording portion (with width L2) of the recording layer 22b, which is heated to the recording temperature and located right under the recording-use magnetic head 2 (with width L1), by the recording-use magnetic head 2. Similarly, information can be reproduced only from a recording portion (with width L2) of the recording layer 22, which is heated to the reproduction temperature and located right under the reproduction-use magnetic head 3 (with width L1), by the reproduction-use magnetic head 3.

Accordingly, with the use of the thermomagnetic recording and reproducing head 50 of this embodiment, it is possible to achieve a narrow track without decreasing the width of the magnetic head 11 (recording-use magnetic head 2 and reproduction-use magnetic head 3), and increase the track density.

Moreover, in this embodiment, as described above, boron nitride or ruthenium oxide is used as a material for the heating head 4 because these materials have high conversion efficiency from electrical energy to infrared energy. Therefore, a rise in the temperature of the heating head 4 itself which is caused when heating the recording portion of the recording layer 22b of the disk medium 22 can be reduced. Consequently, the heat conduction from the heating head 4 to the magnetic head 11 decreases, thereby preventing vicious effects due to a rise in temperature.

The materials and forms of the recording-use magnetic head 2, reproduction-use magnetic head 3, and heating head 4 are not necessarily limited to those described in this embodiment. In other words, the recording-use magnetic head 2 is not limited to the one mentioned above if it is a head for recording information in a recording portion heated to the recording temperature. Similarly, the reproduction-use magnetic head 3 is not limited to the one mentioned above if it is a head for reproducing information from a recording portion heated to the reproduction temperature. In addition, the heating head 4 is not limited to the one mentioned above if it is a head for heating the recording portion located right under the recording-use head 2 to the recording temperature during recording, and heating the recording portion located right under the reproduction-use magnetic head 3 to the reproduction temperature during reproduction. For example, a light emitting element such as a semiconductor laser, or a heater element for generating Joule heat can be used for the heating head 4.

Figure 6:
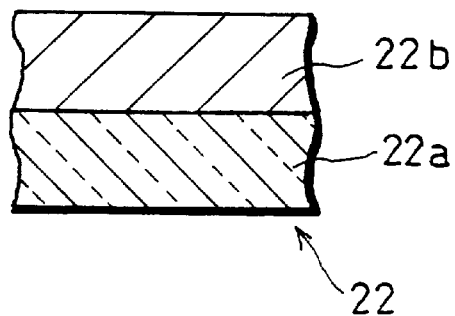
FIG. 6 is a view showing a schematic structure of thermomagnetic recording medium according to one embodiment of the present invention.

Next, the following description will explain the disk medium 22 as a thermomagnetic recording medium of this embodiment with reference to FIG. 6.

As illustrated in FIG. 6, the disk medium 22 as a thermomagnetic recording medium of this embodiment includes the recording layer 22b (with a thickness of, for example, 0.5 μm) on the glass substrate 22a (with a thickness of, for example, 1.5 mm).

The recording layer 22b is a 100-nm-thick N-type ferrimagnetic material made from Li—Cr ferrite or YGaFeO by sputtering. In order to record and reproduce information through the above-mentioned thermomagnetic recording and reproducing head 50, the N-type ferrimagnetic material is adjusted so that the coercive force of the material at the recording temperature is recordable by the recording-use magnetic head 2, the saturation magnetization of the material at the reproduction temperature is reproducible by the reproduction-use magnetic head 3, and the compensation temperature of the material is substantially room temperature. Since Li—Cr ferrite and YGaFeO are N-type ferrimagnetic materials, it is possible to make the adjustment easily by changing at least the content of Fe or Ga.

Moreover, since Li—Cr ferrite and YGaFeO are oxides, they are chemically stable in the atmosphere. Therefore, unlike optical disks using easily oxidizable magnetic materials, it is not necessary to form a protective layer on the magnetic material, and construct the disk medium 22 so that the recording layer 22b makes direct contact with the atmosphere. As a result, the distance between the composite head 10 and the recording layer 22b (head-to-medium spacing) can be reduced, thereby improving the efficiency of recording and reproducing information, and efficiency of heating the recording layer 22b.

The material for forming the recording layer 22b is not necessarily limited to Li—Cr ferrite and YGaFeO, and any material can be used if it is an N-type ferrimagnetic material. Examples of such a material include rare-earth and transition metal alloys, garnets, and ferrites.

Besides, the structure of the disk medium 22 is not necessarily limited to the one mentioned above. For instance, a protective lubricant layer of, for example, carbon or transparent dielectric material may be applied onto the recording layer 22b. Alternatively, the disk medium 22 may be constructed by forming a layer lined with soft magnetic material such as Cu—Mo Permalloy between the glass substrate 22a and recording layer 22b.

Referring now to FIGS. 7 to 11, the following description will explain that the disk medium 22 having the recording layer 22b produced by adjusting Li—Cr ferrite or YGaFeO in the above-mentioned manner can record and reproduce information through the above-mentioned thermomagnetic recording and reproducing head 50.

Figure 7:
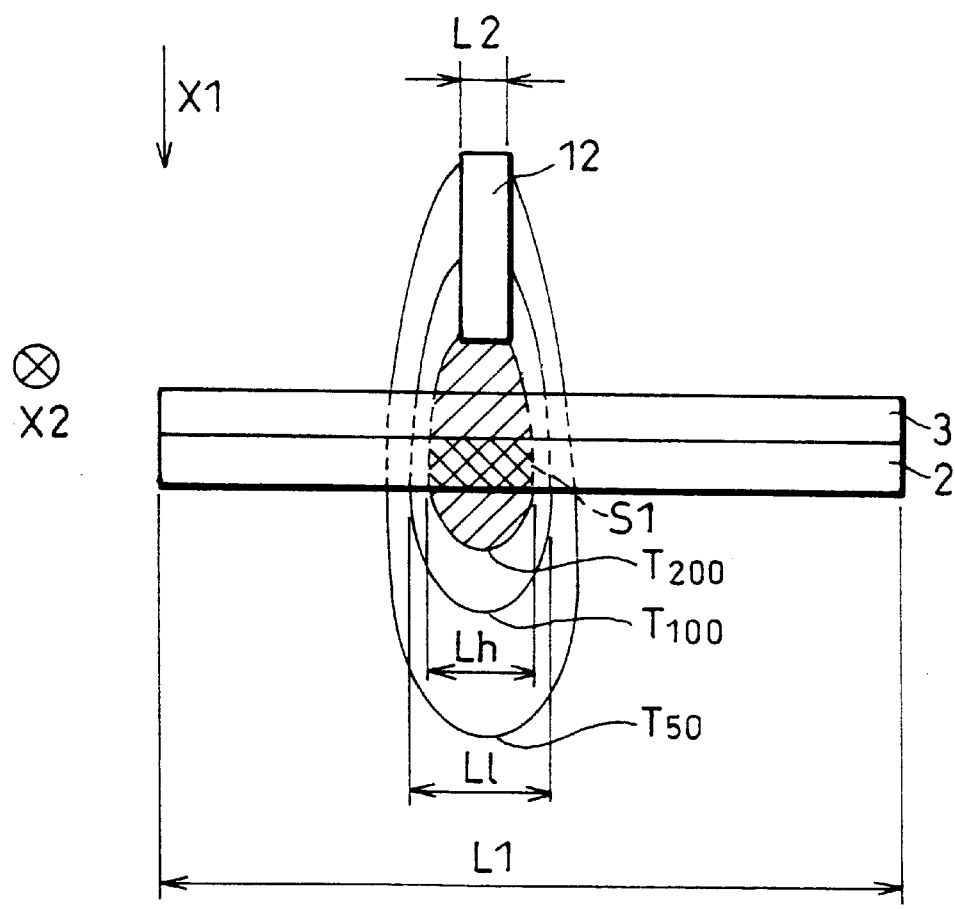
FIG. 7 is a view for explaining the temperature distribution produced when heating the thermomagnetic recording medium shown in FIG. 6 by a heading head as an element of the thermomagnetic recording and reproducing head of FIG. 1.

First, when the recording layer 22b of the disk medium 22 rotating in a direction shown by arrow X1 is heated by the heating head 4, the temperature distribution of FIG. 7 is obtained (when seen from a direction shown by arrow X2 of FIG. 1). The lines $T_{200}$, $T_{100}$, $T_{50}$ are isotherms of 20° C., 100° C., and 50° C., respectively. Here, heating of the recording layer 22b of the disk medium 22 is carried out mainly by radiation from the heating section 12. Therefore, the width Lh of the heated portion is substantially the same as the width L2 of the heating section 12. Thus, an area where information is to be recorded (recording portion) is a portion which is heated by the heating section 12 of the heating head 4 located on an upstream side of the track, at a position right under the heating head 11, and has the width Lh much smaller than the width L1 (L1>L2).

Moreover, the N-type ferrimagnetic material forming the recording layer 22b is adjusted in respect of the coercive force at the recording temperature, the saturation magnetization at the reproduction temperature, and the compensation temperature as described above. Therefore, the temperature distribution of the recording layer 22b becomes substantially uniform irrespectively of the material used for forming the recording layer 22b.

Figure 8:
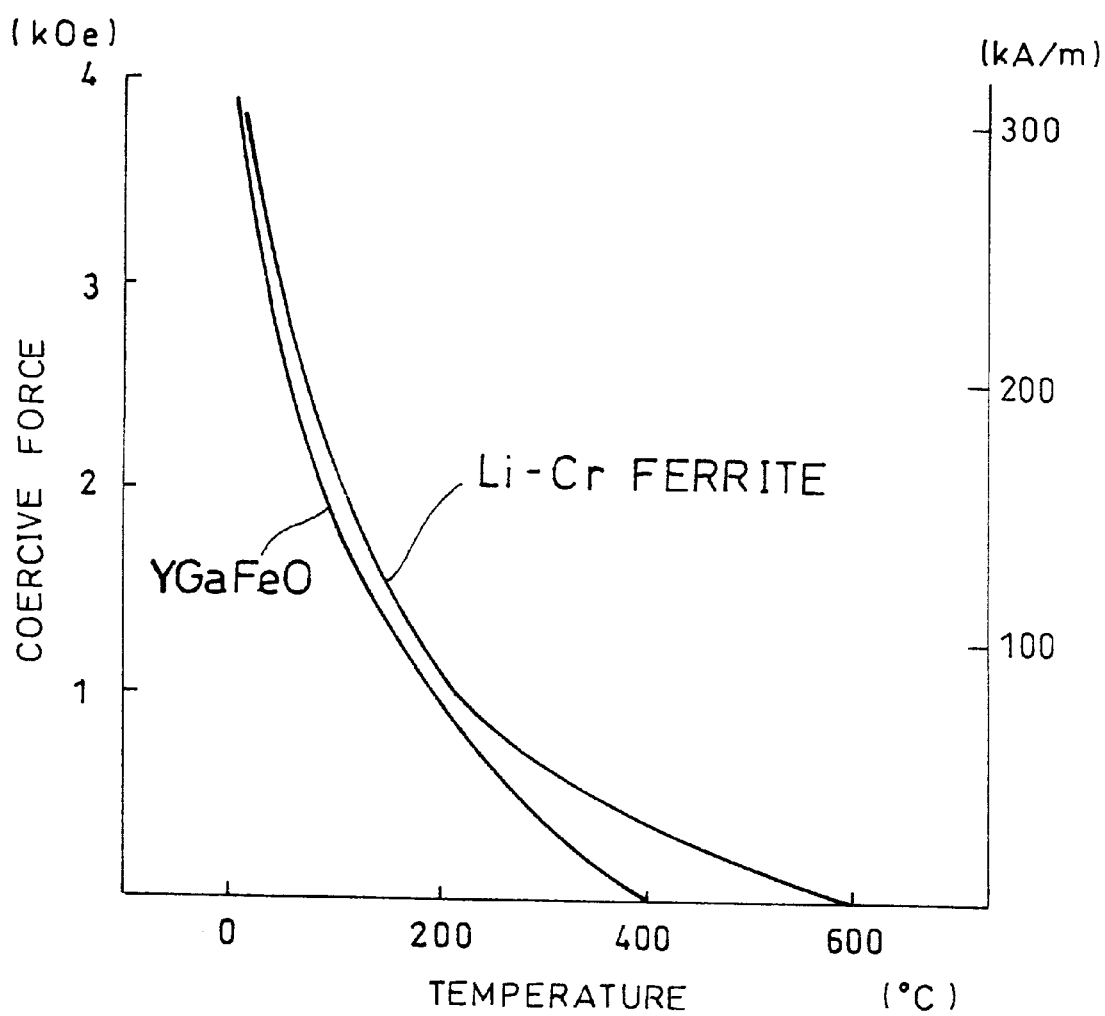
FIG. 8 is a graph showing the relationship between the coercive force and temperature of a recording layer of the thermomagnetic recording medium shown in FIG. 6.

As illustrated in FIG. 8, the recording layer 22b of the disk medium 22 is adjusted so that the coercive force of the recording layer 22b is extremely high at room temperature, and becomes zero at its Curie temperature. Additionally, the recording layer 22b is adjusted so that the coercive force is not higher than 80 kA/m (1 kOe) at temperatures not lower than 200° C. (recording temperature). Namely, in the region inside of the isotherm $T_{200}$ (FIG. 7), the coercive force of the recording layer 22b is not higher than 80 kA/m (1 koe).

Thus, by heating the recording layer 22b of the disk medium 22 to have a state shown by the temperature distribution of FIG. 7 with the heating head 4 and applying a signal magnetic field (an inverting magnetic field, i.e., alternating-current magnetic field, of +80 kA/m (+1 kOe) and −80 kA/m (−1 kOe)) according to information to be recorded with the recording-use magnetic head 2, it is possible to write information in the form of direction of magnetization only in a region Si (recording portion with width Lh) enclosed by the isotherm $T_{200}$ and recording-use magnetic head 2. The strength of the signal magnetic field is arranged to be 80 kA/m (1 kOe) because of such knowledge obtained by experience that the magnetic field applicable by the recording-use magnetic head 2 is around several hundred KA/m (several koe). However, it is not necessarily to arrange the strength of the signal magnetic field to be 80 kA/m (1 kOe).

When writing of information corresponding to one rotation of the track is completed, the floating slider 1 is moved in a radial direction of the disk medium 22 by an amount equal to the width L1 which is slightly wider than the width Lh (for example, an amount corresponding to the isotherm $T_{100}$) so as to arrange the track width to be L1. By resuming writing of information from this position, it is possible to write the information without affecting the track on which information was previously written (i.e., without causing cross writing).

Figure 10:
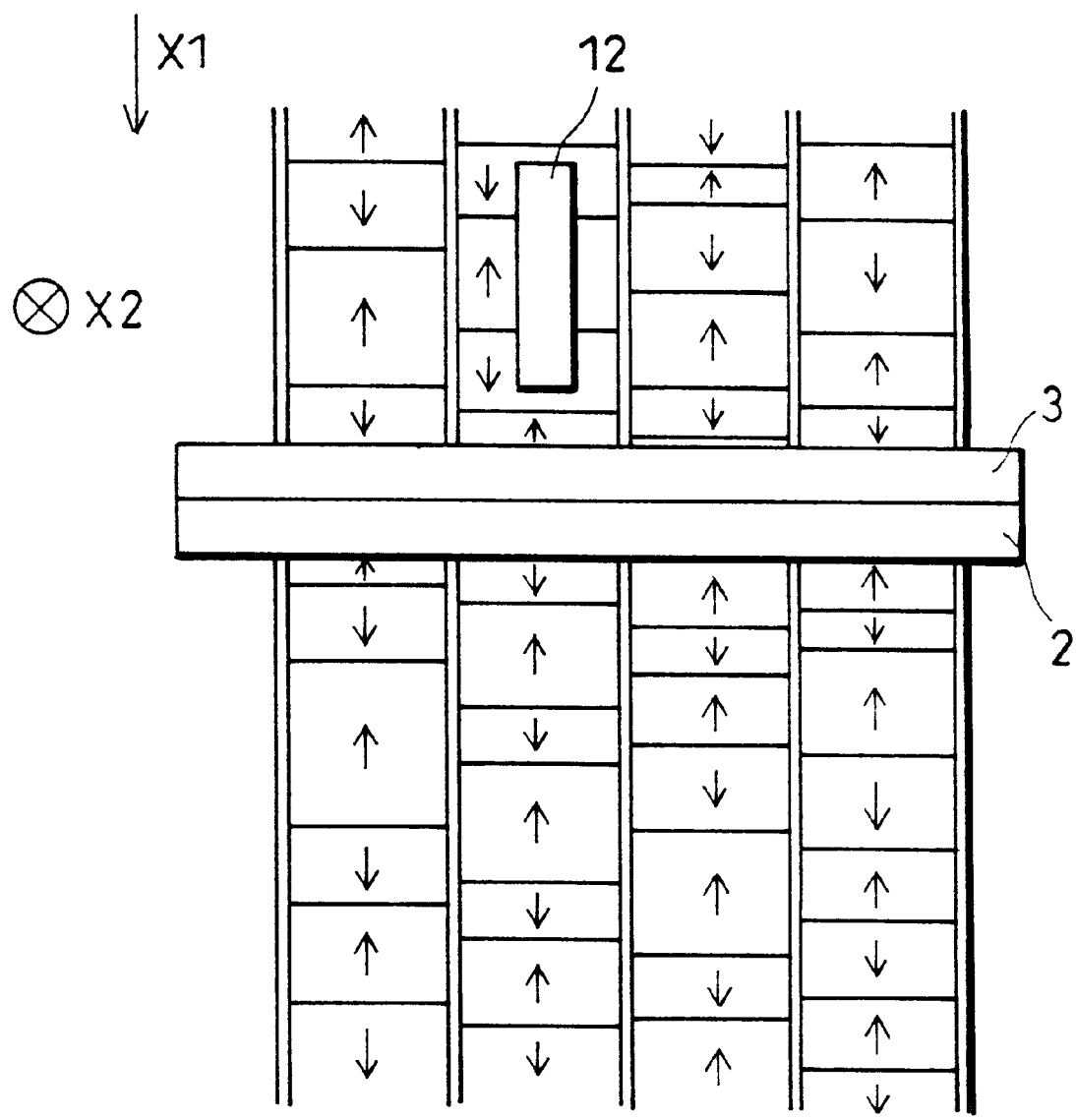
FIG. 10 is a view for explaining the magnetization recorded on the thermomagnetic recording medium shown in FIG. 6 by the heating head and recording-use magnetic head of the thermomagnetic recording and reproducing head of FIG. 1.

As described above, by writing an inverted magnetization on the recording layer 22b, the state shown in FIG. 10 is obtained. More specifically, FIG. 10 shows a state in which the recording layer 22b is not heated by the heating head 4, i.e., a state in which every region of the disk 22 is at room temperature.

Figure 9:
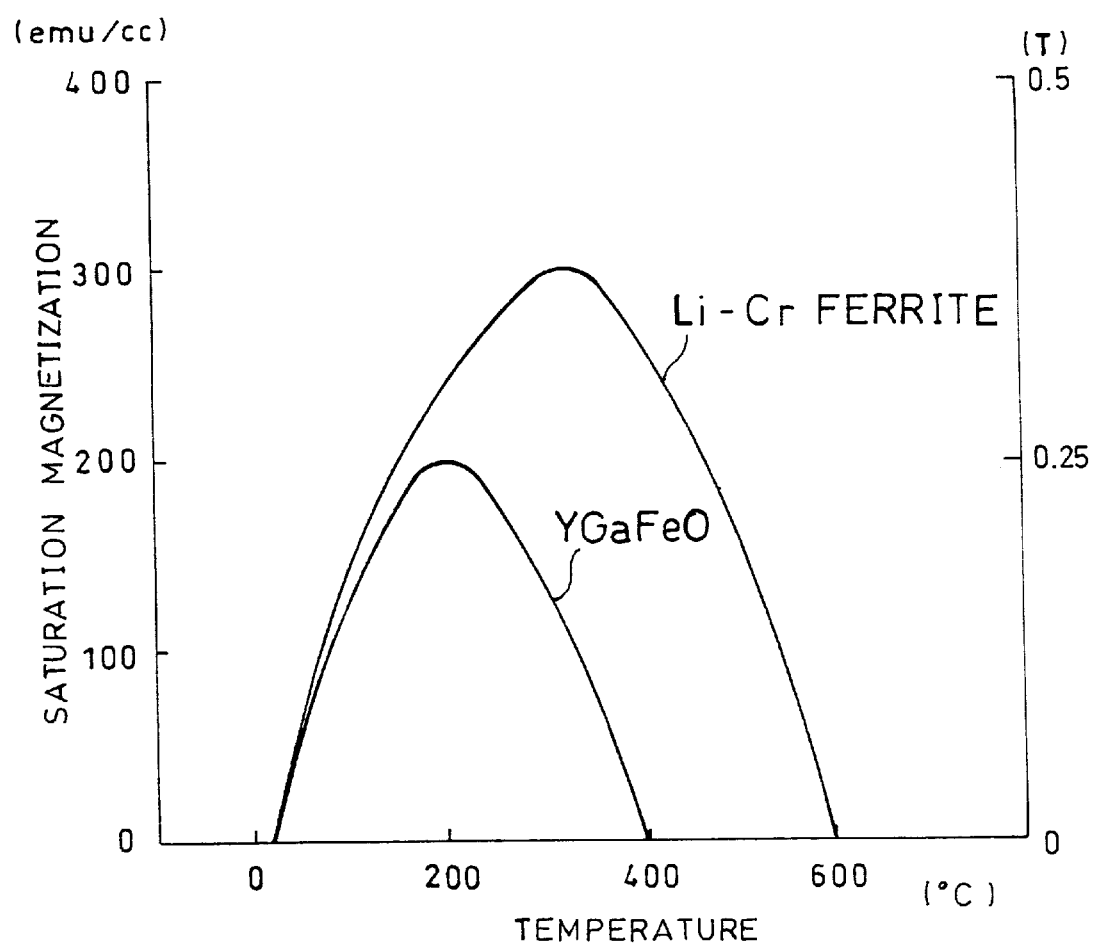
FIG. 9 is a graph showing the relationship between the saturation magnetization and temperature of the recording layer of the thermomagnetic recording medium shown in FIG. 6.

Next, as illustrated in FIG. 9, the saturation magnetization of the recording layer 22b of the disk medium 22 is 0 T (0 emu/cc) at room temperature because the compensation temperature is adjusted to be room temperature. Meanwhile, in order to detect a magnetic flux at the greatest possible saturation magnetization, the recording layer 22b is adjusted so that the saturation magnetization becomes 0.38 T (300 emu/cc) around 300° C. when it is formed by Li—Cr ferrite, and 0.25 T (200 emu/cc) when it is formed by YGaFeO.

With this adjustment, it is possible to prevent the leakage magnetic flux from the recording layer 22b of the disk medium 22. In other words, despite a fact that the information is recorded in the form of inverted magnetization on the recording layer 22b, the magnetic flux can never enter into the reproduction-use magnetic head 3 at room temperature, and therefore information is not reproduced at all.

Figure 11:
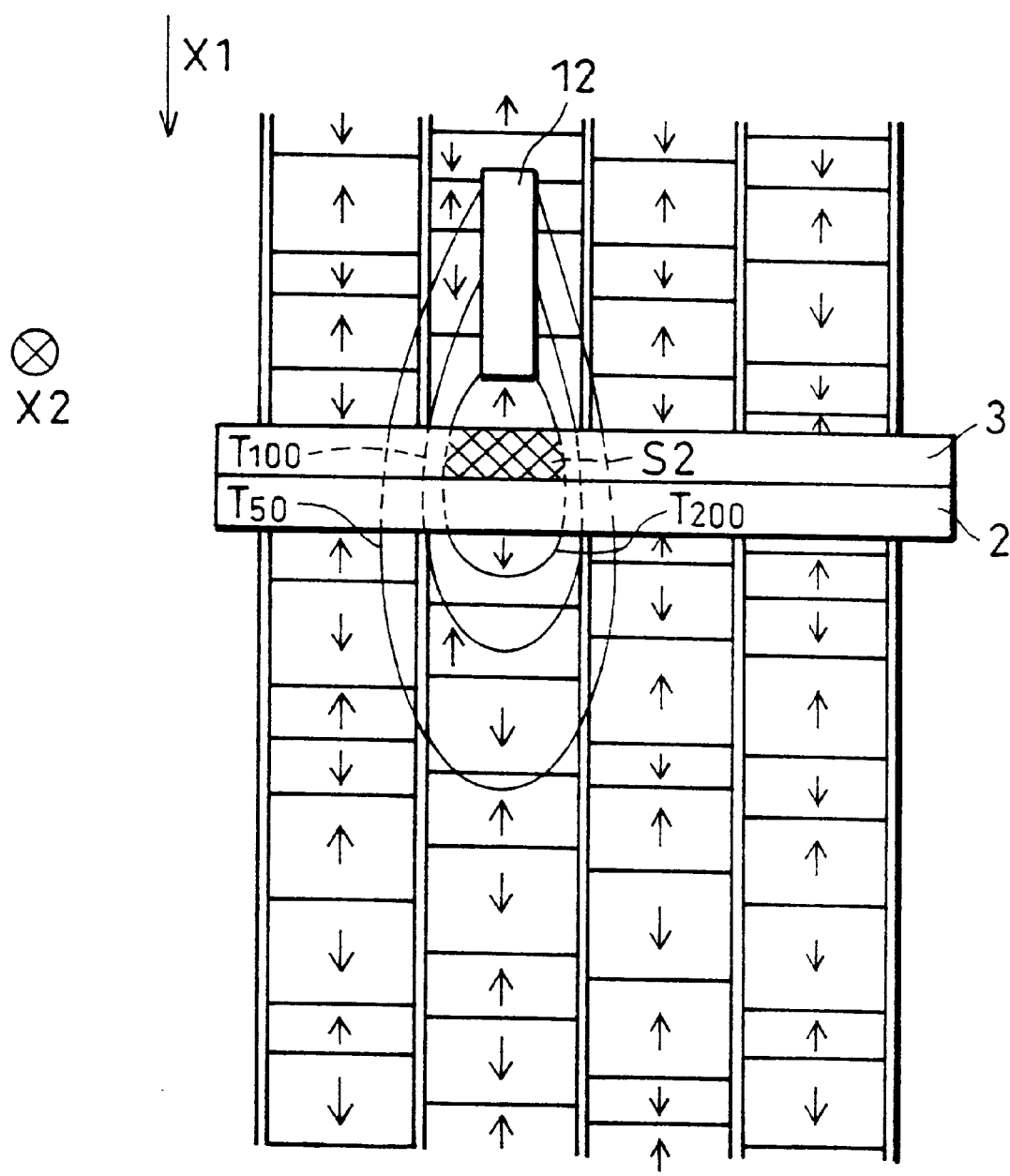
FIG. 11 is a view for explaining the positional relationship between the thermomagnetic recording and reproducing head shown in FIG. 1 and tracks recorded on the thermomagnetic recording medium of FIG. 6.

Besides, as illustrated in FIG. 11, by heating the recording layer 22b to the reproduction temperature, it is possible to detect the generated magnetic flux by the reproduction-use magnetic head 3. It can be understood from FIG. 9 that, when YGaFeO is used for the recording layer 22b, the magnetization increases in the vicinity of 200° C., and becomes smaller at temperatures other than the vicinity of 200° C. Hence, in the magnetic flux generated at the heated portion of the recording layer 22b, the magnetic flux generated in a region enclosed by the isotherm $T_{200}$ dominates. Accordingly, in the magnetic flux detected by the reproduction-use magnetic head 3, the magnetic flux generated in a region S2 (recording portion) enclosed by the isotherm $T_{200}$ and the reproduction-use magnetic head 3 dominates. Thus, information can be practically reproduced without causing crosstalk (mixture of a magnetic flux from adjacent tracks).

As described above, by adjusting the width of the recording portion to be heated by the heating head 4, the track width, the strength of a signal magnetic field to be applied by the recording-use magnetic head 2, and the strength of a magnetic field to be detected by the reproduction-use magnetic head 3, it is possible to record and reproduce information without affecting or being affected by adjacent tracks.

Namely, since the recording layer 22b is adjusted so that the coercive force at the recording temperature is recordable by the recording-use magnetic head 2, it is possible to record information only in the recording portion heated to the recording temperature. Moreover, since the recording layer 22b is adjusted so that the saturation magnetization at the reproduction temperature is reproducible by the reproduction-use magnetic head 3, it is possible to reproduce only information recorded on the recording portion heated to the reproduction temperature. Furthermore, since the compensation temperature is adjusted to be substantially room temperature, the inverted magnetization is stable with respect to an external magnetic field, thereby preventing the leakage magnetic flux.

Figure 13:
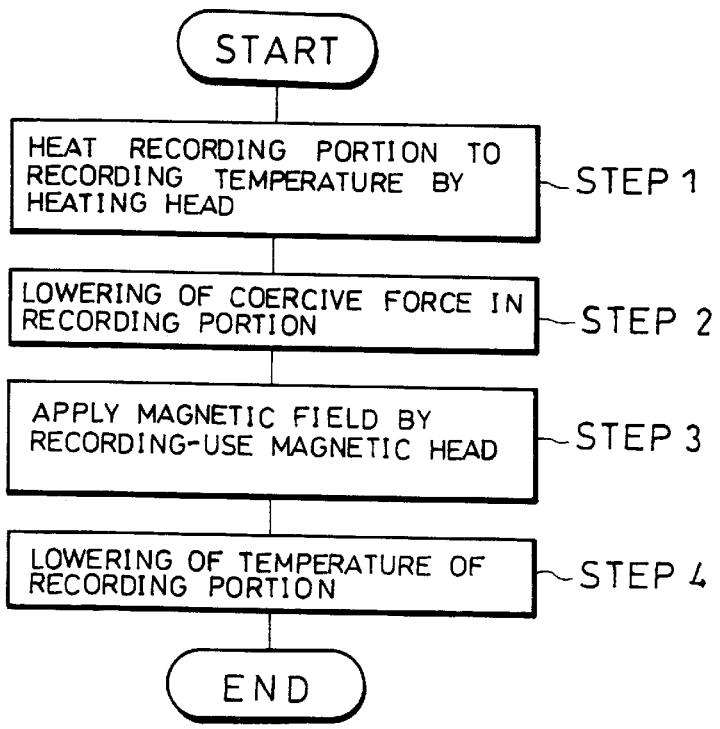
FIG. 13 is a flow chart of a process for recording information on the thermomagnetic recording medium shown in FIG. 6 by the thermomagnetic recording and reproducing device of FIG. 12.
Figure 14:
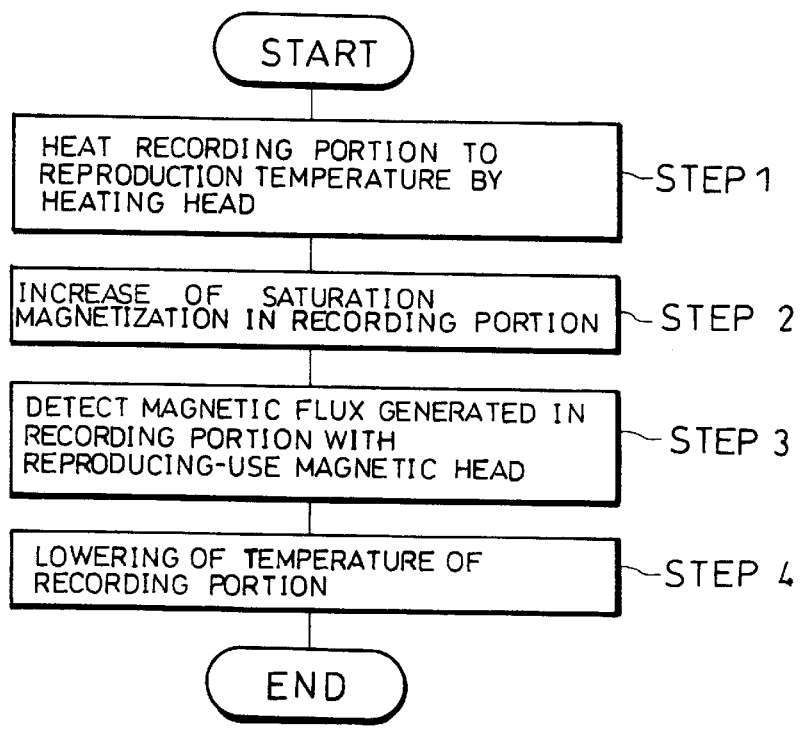
FIG. 14 is a flow chart of a process for reproducing information recorded on the thermomagnetic recording medium shown in FIG. 6 by the thermomagnetic recording and reproducing device of FIG. 12.
Figure 15:
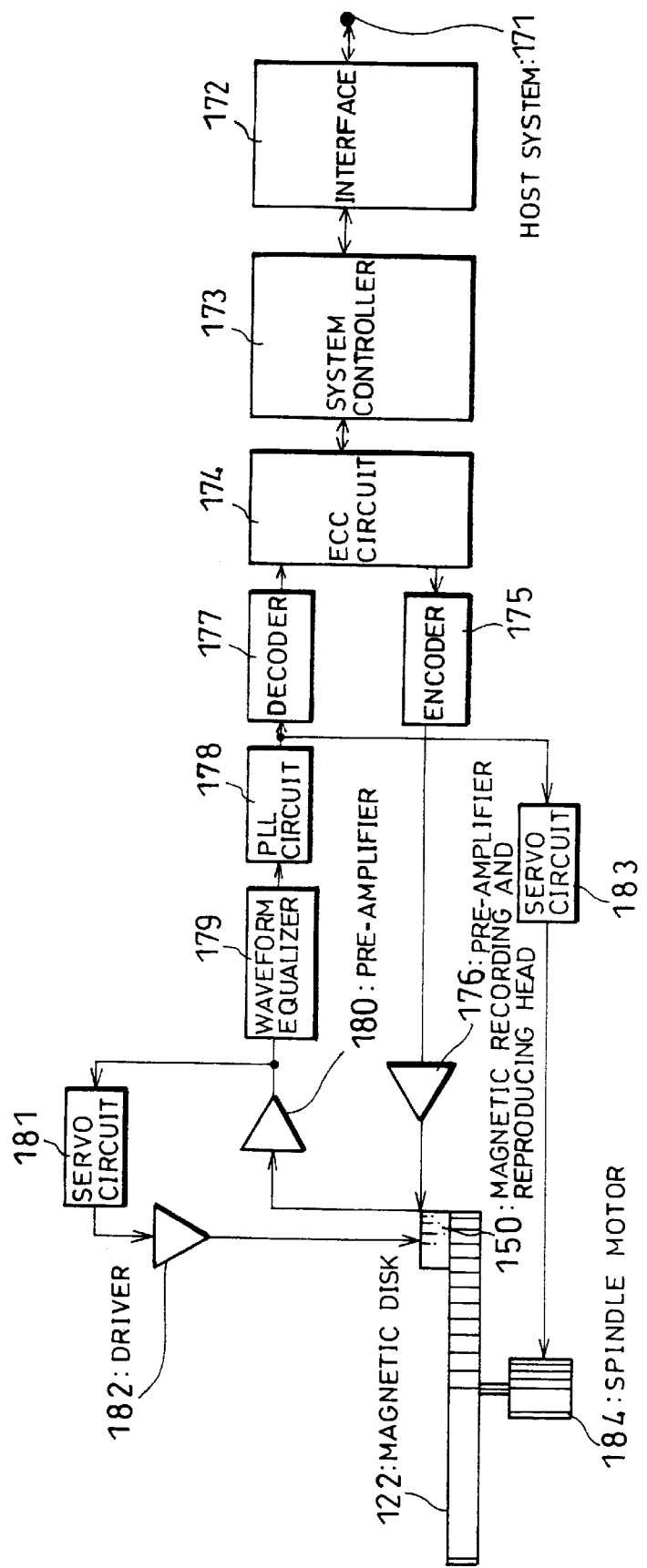
FIG. 15 is a view showing a schematic structure of a conventional magnetic recording and reproducing device.
Figure 16:
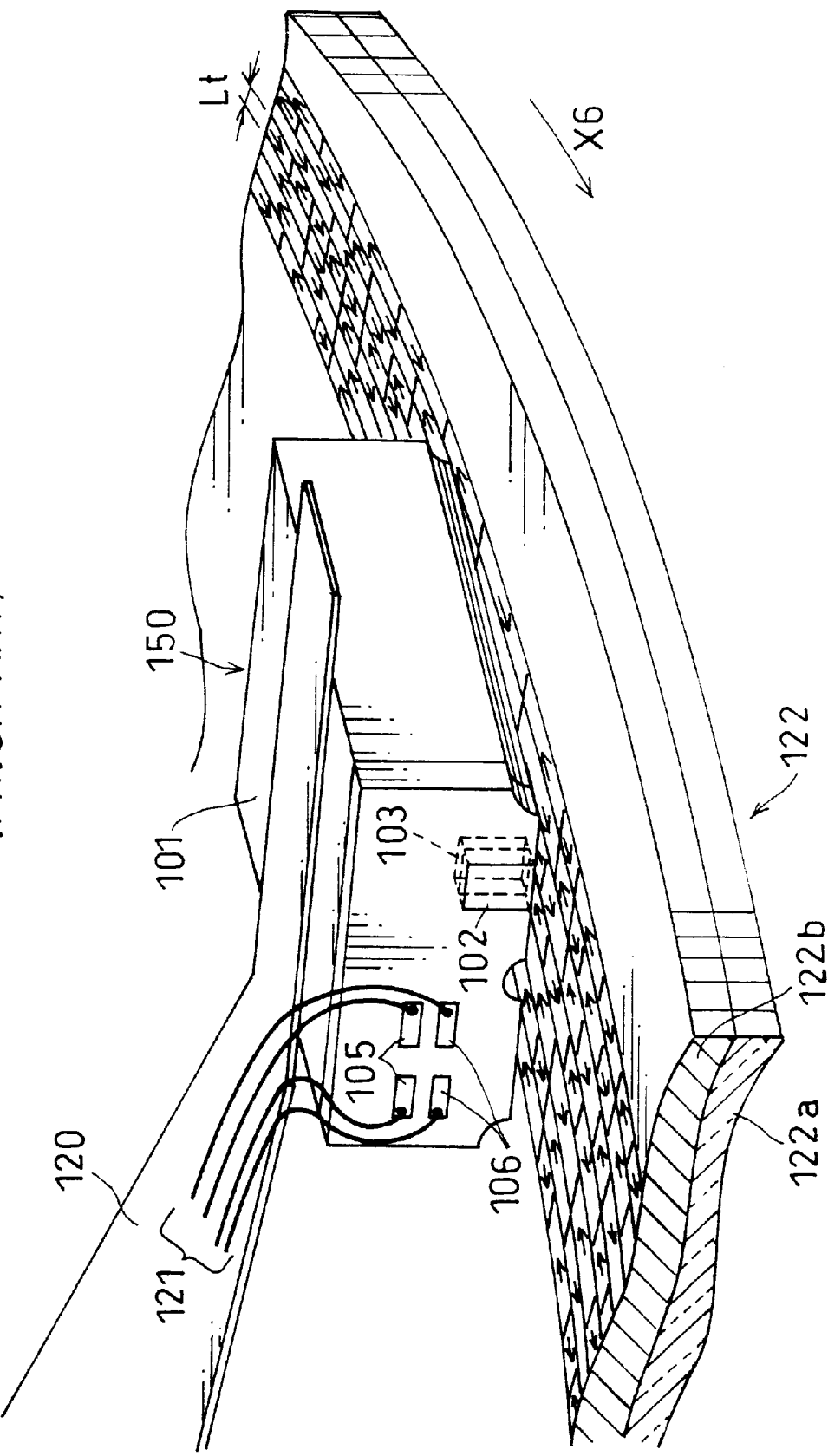
FIG. 16 is a view showing a schematic structure of a conventional magnetic recording and reproducing head.

Next, with reference to FIGS. 13 and 14, the following description will explain a process for recording and reproducing information on the disk medium 22 by the thermomagnetic recording and reproducing device 70 of this embodiment.

As described above, the thermomagnetic recording and reproducing device 70 is provided with the system controller 73 and heating driver 83 as recording control means (FIG. 12). Information is recorded on the disk medium 22 by controlling the recording-use magnetic head 2, heating head 4, etc. with the recording control means.

As shown in FIG. 13, recording of information on the disk medium 22 by the thermomagnetic recording and reproducing device 70 is carried out through the following steps .

Step 1: heating the recording portion of the recording layer 22b of the disk medium 22 to the recording temperature by the heating head 4.

Step 2: lowering the coercive force with an increase in the temperature of the recording portion.

Step 3: applying a signal magnetic field corresponding to information, to be recorded, by the recording-use magnetic head 2 so as to record information only in the recording portion where the coercive force is lowered.

Step 4: lowering the temperature of the recording portion.

As described above, by controlling the recording-use magnetic head 2, heating head 4, etc. with the recording control means, it is possible to heat a recording portion whose width is narrower than the recording-use magnetic head 2 to the recording temperature by the heating head 4, and record information only in the recording portion, without affecting adjacent tracks.

Consequently, the width of the track can be narrowed without decreasing the width of the recording-use magnetic head 2. It is thus possible to provide a thermomagnetic recording and reproducing device capable of increasing the capacity of a thermomagnetic recording medium by increasing the track density thereof.

Subsequently, the following description will explain reproduction. As described above, the thermomagnetic recording and reproducing device 70 is provided with the system controller 73 and heating driver 83 as the reproduction control means (FIG. 12). Information is reproduced from the disk medium 22 by controlling the reproduction-use magnetic head 3, heating head 4, etc. with the reproduction control means.

As illustrated in FIG. 14, reproduction of information from the disk medium 22 by the thermomagnetic recording and reproducing device 70 is carried out through the following steps.

Step 1: heating the recording portion of the recording layer 22b of the disk medium 22 to the reproduction temperature by the heating head 4.

Step 2: increasing the saturation magnetization with a rise in the temperature of the recording portion.

Step 3: detecting a magnetic flux generated in the recording portion having increased saturation magnetization by the reproduction-use magnetic head 3.

Step 4: lowering the temperature of the recording portion.

As described above, by controlling the reproduction-use magnetic head 3, heating head 4, etc. with the reproduction control means, it is possible to heat a recording portion whose width is narrower than the reproduction-use magnetic head 3 to the reproduction temperature by the heating head 4, and reproduce only information recorded in this recorded portion, without being affected by adjacent tracks.

Consequently, the width of the track can be narrowed without decreasing the width of the reproduction-use magnetic head 3. It is thus possible to provide a thermomagnetic recording and reproducing device capable of increasing the capacity of a thermomagnetic recording medium by increasing the track density thereof.

By the way, each of the U.S. Pat. No. 5,656,385 and Japanese Patent No. 2617025 discloses a magnetic recording medium positioned between an optical head and a magnetic head, and a method of recording and reproducing information on the magnetic recording medium.

Whereas in the thermomagnetic recording and reproducing device 70 of this embodiment, as described above with reference to FIG. 1, the heating head 4 for heating the disk medium 22, and the recording-use magnetic head 2 and reproduction-use magnetic head 3 are positioned on the same side of the disk medium 22. With this structure, it is possible to decrease the size of the thermomagnetic recording and reproducing device, and increase the capacity of the recording medium because both sides of the disk can be made recordable.

As described above, the thermomagnetic recording and reproducing head of the present invention can be constructed so that the heating head has a heating section made from boron nitride or ruthenium oxide.

With this structure, by forming the heating section of the heating head using boron nitride or ruthenium oxide, it is possible to provide the heating head with a heating section having high conversion efficiency from electrical energy to infrared energy.

Accordingly, the power required for raising the temperature of the recording portion of the recording layer 22b of the disk medium 22 can be reduced. Moreover, since a rise in the temperature of the heating head itself can be limited, it is possible to reduce the heat conduction from the heating head to the magnetic head, thereby preventing vicious effects due to the rise in temperature.

As described above, the thermomagnetic recording and reproducing device of the present invention can be constructed to include the thermomagnetic recording and reproducing head, and recording control means for magnetically recording information in a recording portion of the recording layer of the thermomagnetic recording medium, which portion has a width narrower than the recording-use magnetic head, by heating the recording portion to the recording temperature by the heating head so as to decrease the coercive force of the recording portion and simultaneously applying a signal magnetic field according to information, to be recorded, by the recording-use magnetic head.

With this structure, when recording information, since the recording control means controls the heating head and recording-use magnetic head in the above-mentioned manner, it is possible to record information only in the recording portion which has a width narrower than the recording-use magnetic head and has been heated to the recording temperature by the heating head, without affecting adjacent tracks.

Accordingly, it is possible to narrow the width of the track without decreasing the width of the recording-use magnetic head. As a result, since the track density of the thermomagnetic recording medium can be increased, it is possible to increase the capacity thereof.

Furthermore, as described above, the thermomagnetic recording and reproducing device of the present invention can be constructed to include the thermomagnetic recording and reproducing head, and reproduction control means for reproducing information by heating a recording portion of the recording layer of the thermomagnetic recording medium, which portion has a width narrower than the reproduction-use magnetic head, to the reproduction temperature by the heating head so as to increase the saturation magnetization of the recording portion and simultaneously detecting a magnetic flux generated from the recording portion according to the recorded information by the reproduction-use magnetic head.

With this structure, when reproducing information, since the reproduction control means controls the heating head and reproduction-use magnetic head in the above-mentioned manner, it is possible to reproduce only the information recorded in a recording portion which has a width narrower than the reproduction-use magnetic head and has been heated to the reproduction temperature by the heating head, without being affected by adjacent tracks.

Accordingly, it is possible to narrow the width of the track without decreasing the width of the reproduction-use magnetic head. Consequently, the track density of the thermomagnetic recording medium can be increased, and therefore the capacity thereof is increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thermomagnetic recording and reproducing head comprising:
   a recording-use magnetic head for applying a signal magnetic field according to information to be recorded to a recording portion of a recording layer of a thermomagnetic recording medium heated to a recording temperature during recording;
   a reproducing-use magnetic head for detecting a magnetic flux generated according to recorded information from the recording portion of the recording layer of the thermomagnetic recording medium heated to a reproduction temperature during reproduction; and
   a heating head with a width narrower than said recording-use magnetic head and reproduction-use magnetic head, for heating the recording portion of the thermomagnetic recording medium to the recording temperature during recording, and to the reproduction temperature during reproduction, wherein the reproduction temperature is less than the Curie temperature of material comprising the recording layer of the thermomagnetic recording medium.

2. The thermomagnetic recording and reproducing head as set forth in claim 1,
   wherein said heating head, recording-use magnetic head, and reproduction-use magnetic head are arranged in this order from an upstream side of a track formed on the thermomagnetic recording medium.

3. The thermomagnetic recording and reproducing head as set forth in claim 1,
   wherein said heating head includes a heating section which is made from a material for converting electrical energy into infrared energy and raises a temperature of the recording portion of the thermomagnetic recording medium by radiation.

4. The thermomagnetic recording and reproducing head as set forth in claim 3,
   wherein said heating section is made from boron nitride or ruthenium oxide.

5. The thermomagnetic recording and reproducing head as set forth in claim 1,
   wherein said heating head is produced by placing a covering layer made from a material for converting electrical energy into infrared energy on two side faces of a triangular prism made from an insulating material, and includes a heating section for raising a temperature of the recording portion of the thermomagnetic recording medium by radiation, said heating section being said covering layer placed on a side as a boundary between said two side faces of said triangular prism covered with said covering layer, and
   both end sections of an end face of said covering layer on a base face side of said triangular prism are connected to electrodes, respectively.

6. The thermomagnetic recording and reproducing head as set forth in claim 5,
   wherein said heating head, recording-use magnetic head, and reproduction-use magnetic head are arranged in this order from an upstream side of a track formed on the thermomagnetic recording medium so that a direction of said side as the boundary of said two side faces of said triangular prism covered with said covering layer of said heating head coincides with a direction of a thickness of each of said recording-use magnetic head and reproduction-use magnetic head.

7. The thermomagnetic recording and reproducing head as set forth in claim 4,
   wherein said trianguar prism of said heating head is made from $SiO_2$.

8. The thermomagnetic recording and reproducing head as set forth in claim 5, wherein said heating head, reproduction-use magnetic head, and recording-use magnetic head are arranged in this order from an upstream side of a track formed on the thermomagnetic recording medium so that a direction of said side as the boundary of said two side faces of said triangular prism covered with said covering layer of said heating head coincides with a direction of a thickness of each of said recording-use magnetic head and reproduction-use magnetic head.

9. The thermomagnetic recording and reproducing head as set forth in claim 1,
   wherein said recording-use magnetic head is a thin film inductive head, and said reproduction-use magnetic head is a magneto-resistive head.

10. The thermomagnetic recording and reproducing head as set forth in claim 1, wherein said heating head, reproduction-use magnetic head, and recording-use magnetic head are arranged in this order from an upstream side of a track formed on the thermomagnetic recording medium.

11. The thermomagnetic recording and reproducing head as set forth in claim 1, wherein said heating head is one of a light emitting element or a heater element that generates Joule heat.

12. The thermomagnetic recording and reproducing head as set forth in claim 1, wherein said heating head is configured and arranged such that a width of the recording portion is substantially the same as the width of said heating head.

13. A thermomagnetic recording and reproducing device comprising:
    a floating slider which floats over a thermomagnetic recording medium with a rotation of the thermomagnetic recording medium; and
    a thermomagnetic recording and reproducing head mounted on said floating slider, said thermomagnetic recording and reproducing head including:
      a recording-use magnetic head for applying a signal magnetic field according to information to be recorded, to a recording portion of a recording layer of the thermomagnetic recording medium heated to a recording temperature during recording;
      a reproduction-use magnetic head for detecting a magnetic flux generated according to recorded information from the recording portion of the recording layer of the thermomagnetic recording medium heated to a reproduction temperature during reproduction; and
      a heating head with a width narrower than said recording-user magnetic head, for heating the recording portion of the thermomagnetic recording medium to the recording temperature during recording, and to the reproduction temperature during reproduction, wherein the reproduction temperature is less than the Curie temperature of material comprising the recording layer of the thermomagnetic recording medium.

14. The thermomagnetic recording and reproducing device as set forth in claim 13,
    wherein said heating head includes a heating section which is made from a material for converting electrical energy into infrared energy and raises a temperature of the recording portion of the thermomagnetic recording medium by radiation.

15. The thermomagnetic recording and reproducing device as set forth in claim 14,
    wherein said heating section is made from boron nitride or ruthenium oxide.

16. The thermomagnetic recording and reproducing device as set forth in claim 13, further comprising recording control means for controlling said heating head to heat a recording portion of the recording layer of the thermomagnetic recording medium, which portion has a width narrower than said recording-use magnetic head, to the recording temperature so as to reduce a coercive force of the recording portion, and controlling said recording-use magnetic head to apply a signal magnetic field according to information to be recorded so as to magnetically record information in the recording portion.

17. The thermomagnetic recording and reproducing device as set forth in claim 13, further comprising reproduction control means for controlling said heating head to heat a recording portion of the recording layer of the thermomagnetic recording medium, which portion has a width narrower than said reproduction-use magnetic head, to the reproduction temperature so as to increase saturation magnetization of the recording portion, and controlling said reproduction-use magnetic head to detect a magnetic flux generated in the recording portion according to the recorded information so as to reproduce information.

18. The thermomagnetic recording and reproducing device as set forth in claim 13, further comprising recording control means for controlling said heating head to heat the recording portion of the recording layer, which is adjusted to have a coercive force of not more than 1 kOe at temperatures not lower than 200° C., to a temperature not lower than 200° C., and for controlling said recording-use magnetic head to apply inverting magnetic fields of +1 kOe and −1 kOe according to information to be recorded.

19. The thermomagnetic recording and reproducing device as set forth in claim 13, wherein said heating head is one of a light emitting element or a heater element that generates Joule heat.

20. The thermomagnetic recording and reproducing device as set forth in claim 13, wherein said heating head is configured and arranged such that a width of the recording portion is substantially the same as the width of said heating head.

21. A process for fabricating a thermomagnetic recording and reproducing head comprising the steps of:

producing a heating head by forming electrodes on a substrate, forming a triangular prism on said electrodes by an insulating material, and forming a covering layer on two side faces of said triangular prism by a material for converting electrical energy into infrared energy; and producing a magnetic head by forming a recording-use magnetic head and a reproduction-use magnetic head adjacent to said triangular prism so that a direction of a side as a boundary of said two side faces of said triangular prism covered with said covering layer of said heating head coincides with a direction of a thickness of each of said recording-use magnetic head and reproduction-use magnetic head.

22. The process for fabricating a thermomagnetic recording and reproducing head as set forth in claim 21, wherein the step of producing said magnetic head produces said recording-use magnetic head and reproduction-use magnetic head so that said heating head, recording-use magnetic head and reproduction-use magnetic head are arranged in this order from an upstream side of a track formed on a thermomagnetic recording medium.

23. The process for fabricating a thermomagnetic recording and reproducing head as set forth in claim 21, wherein said covering layer of said heating head is made from boron nitride or ruthenium oxide.

24. The process for fabricating a thermomagnetic recording and reproducing head as set forth in claim 21, wherein said triangular prism of said heating head is made from $SiO_2$.

25. The process for fabricating a thermomagnetic recording and reproducing head as set forth in claim 21, wherein the step of producing said magnetic head produces said recording-use magnetic head and reproduction-use magnetic head so that said heating head, reproduction-use magnetic head and recording-use magnetic head are arranged in this order from an upstream side of a track formed on a thermomagnetic recording medium.

26. The process for fabricating a thermomagnetic recording and reproducing head as set forth in claim 21, wherein said step of producing a heating head further includes configuring said heating head such that a width of a portion of a recording medium in which information is to be recorded is substantially the same as a width of said heating head.

* * * * *